(12) United States Patent
Musi (10) Patent No.: US 8,695,995 B2
(45) Date of Patent: Apr. 15, 2014

(54) WHEELED COLLAPSIBLE SHOPPING BAG DEVICE

(76) Inventor: Juan Carlos Musi, Sunny Isles Beach, FL (US)

(*) Notice: Subject to any disclaimer, the term of this patent is extended or adjusted under 35 U.S.C. 154(b) by 0 days.

(21) Appl. No.: 12/864,804

(22) PCT Filed: Jan. 14, 2010

(86) PCT No.: PCT/US2010/000087
§ 371 (c)(1),
(2), (4) Date: Jul. 27, 2010

(87) PCT Pub. No.: WO2011/087471
PCT Pub. Date: Jul. 21, 2011

(65) Prior Publication Data
US 2012/0013090 A1      Jan. 19, 2012

Related U.S. Application Data

(63) Continuation-in-part of application No. 11/873,614, filed on Mar. 4, 2008.

(51) Int. Cl.
   *B62B 3/00*           (2006.01)
(52) U.S. Cl.
   USPC .................................. 280/47.34; 380/DIG. 3

(58) Field of Classification Search
   USPC ........ 280/37, 30, 35, 47.26, 47.33, 47.19, 42, 280/47.24, 644, DIG. 4, 652, 654, 651, 280/DIG. 3; 16/29, 31 R
   See application file for complete search history.

(56) References Cited

U.S. PATENT DOCUMENTS

| | | | | |
|---|---|---|---|---|
| 2,595,269 A | * | 5/1952 | Keys | 280/47.33 |
| 2,777,708 A | * | 1/1957 | Patterson | 280/37 |
| 3,197,225 A | | 7/1965 | Powell | 280/652 |
| 8,152,178 B2 | * | 4/2012 | Sun et al. | 280/35 |
| 2009/0140504 A1 | * | 6/2009 | Sun | 280/30 |

* cited by examiner

*Primary Examiner* — John Walters
*Assistant Examiner* — James Triggs
(74) *Attorney, Agent, or Firm* — Sanchelima & Associates, P.A.

(57) ABSTRACT

A low weight wheeled bag device having a bottom assembly having two crossed members with an upperside and an underside. The wheel members are coaxially mounted to a shaft journaled by two bushing members at the ends. Spacer leg members have cooperative dimensions to permit the bottom assembly to be at rest at a substantially parallel and spaced apart relationship with respect to a supporting surface. A bag member with flat bottom wall is mounted over the upperside and extends upwardly defining an internal compartment and an upper end opening. A reinforcement member can be optionally added to the bottom wall to enhance its structural integrity. A user tilts the bag assembly and pulls it from handles mounted adjacent to the opening causing the wheels to roll and the assembly to easily move with its contents.

8 Claims, 8 Drawing Sheets

WHEELED COLLAPSIBLE SHOPPING BAG DEVICE

OTHER RELATED APPLICATIONS

The present application is a continuation-in-part of pending U.S. patent application Ser. No. 11/873,614, filed on Mar. 4, 2008, which is hereby incorporated by reference.

BACKGROUND OF THE INVENTION

1. Field of the Invention

The present invention relates to a wheeled shopping bag device, and more particularly, to a collapsible, lightweight, yet strong, low cost, recyclable and disposable-wheeled shopping bag device that is environmentally compatible with characteristics that readily allow for its compact stacking, easy deployment, quick opening, stability, and structural strength.

2. Description of the Related Art

Several designs for wheeled shopping bags have been designed in the past. None of them, however, includes the conveniences claimed herein. The present invention utilizes eco-friendly materials with greater resistance and capacity than conventional bags, achieving low cost and weight characteristics, while maintaining sufficient strength and being collapsible for compact stacking and storage as well as being easily deployed by a user.

Applicant believes that the closest related reference corresponds to U.S. Pat. No. 3,197,225 issued to Powell for a Collapsible Shopping Bag hereinafter "Powell Bag". However, it differs from the present invention because, it relies on the use of hinges and supports made of sheet metal, fabric, or a combination thereof with the intent of being reused and does not rest on its roller system assembly when at rest due to the obtuse angle of attachment of the wheels. The present invention, on the other hand, is made of a disposable, lightweight material, yet with some rigidity, that sits on its roller system when at rest, aided by folds causing it to stand in a substantially upright position. Furthermore, the patented bag does not claim or demonstrate any stacking characteristics if collapsed. Nor does it disclose crossed-members for its base assembly to reduce weight and costs as claimed herein.

One of the disadvantages of the current designs for wheeled bags is that they rely on a multiplicity of parts, such as hinges, fasteners, and reinforcing members, to achieve stability and collapsibility. These parts result in high material and manufacturing cost. These designs must accommodate long term personal reuse, and thus focus on collapsing to the smallest possible dimensions to permit a person to carry them. Still another shortcoming of the current designs is that they are unsuitable for stacking due, among other factors, to lateral instability, protrusions of rigid supports, bulk, and lack of flat surfaces.

The present invention provides a low weight and volumetrically efficient solution for collapsible bags that permit its rapid folding and deployment by using a combination of folds and slots to permit the air to vent in and out of the bag. Trapped air prevents the rapid collapse of bags, especially if the bag's opening is closed. In folding a bag, the opening at the distal end of the bag is typically closed and then folded along a predetermined first folding line, then a second one, until different layers of the flattened bag are stacked over each other. In doing this, air is trapped inside the bag providing some resistance to the folding operation. By providing slots along the vertical walls of the bag, preferably along its diagonal folds, the air inside is allowed to exit. This facilitates the folding of the bag. The reverse operation is also helped. As a user unfolds the bag, air enters through the bag's opening as well as through the slots.

The base or bottom assembly in the present invention includes a pair of coaxially disposed wheels mounted to its underside, opposite to each other at the end of a shaft. The other end includes a spacer leg assembly, opposite to the shaft supporting the coaxially disposed wheels. The dimensions of the spacer leg assembly cooperate with those of the wheels to permit the bag assembly to be at an upright position when at rest. In one of the embodiments, the bottom assembly is implemented using moldable material technology. Minimization of the material used is achieved with two crossed, elongated, and rigid members using molding technology. In one of the embodiments, the crossed members include through openings for permitting the glue to go through and achieve better engagement of the base assembly with the bottom of the bag member. Reinforcement angular members further strengthen the attachment to bushing members that journal the shaft supporting the wheels. Another way of attaching the bottom of the bag members to the base is through the use of ultrasound welding. For this, the paper used for the bag member is covered with a thin film of plastic material that is welded with the plastic material used for the cross members. None of these features are disclosed in the prior art.

The present invention also solves the prior art problems by using a bottom or base assembly with simple parts and paper bags that can be glued and do not require hinges or similar hardware. Strength of the wheeled base is enhanced through the use of reinforced cross-members with a substantially flat upperside. As a result of the design, multiple units may be stacked stably in their collapsed states. The folding characteristics of paper bags achieve collapsibility when integral hinges or folds are created along cooperative locations. The folds are positioned so that the folded portions of the bag member leave a clearance for the spacer leg members to fit in the collapsed disposition.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a collapsible wheeled bag device of sufficient strength and rigidity to carry goods normally carried by the shopper in a non-wheeled bag.

It is another object of this invention to provide a bag with a wheeled mechanism that allows a shopper to pull it when tilted at an angle that varies in accordance with the height of the user's body.

It is also an objective of the present invention to provide a wheeled bag device that is easily and readily deployed and opened by a user as well as collapsed when ready for storage with minimum resistance from the air inside the bag member.

It is still another object of the present invention to provide a device that stacks compactly so that a single device can be removed from the top of the stack without disruption to the rest.

It is also an object of the present invention that the device rests in a substantially upright position when not being pulled by the shopper.

It is yet another object of this invention to provide such a bag device that is inexpensive to manufacture and maintain while retaining its effectiveness.

An objective of the present invention is that the bag has characteristics similar to that of other paper shopping bags, such as its low weight and low cost with enhanced strength.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
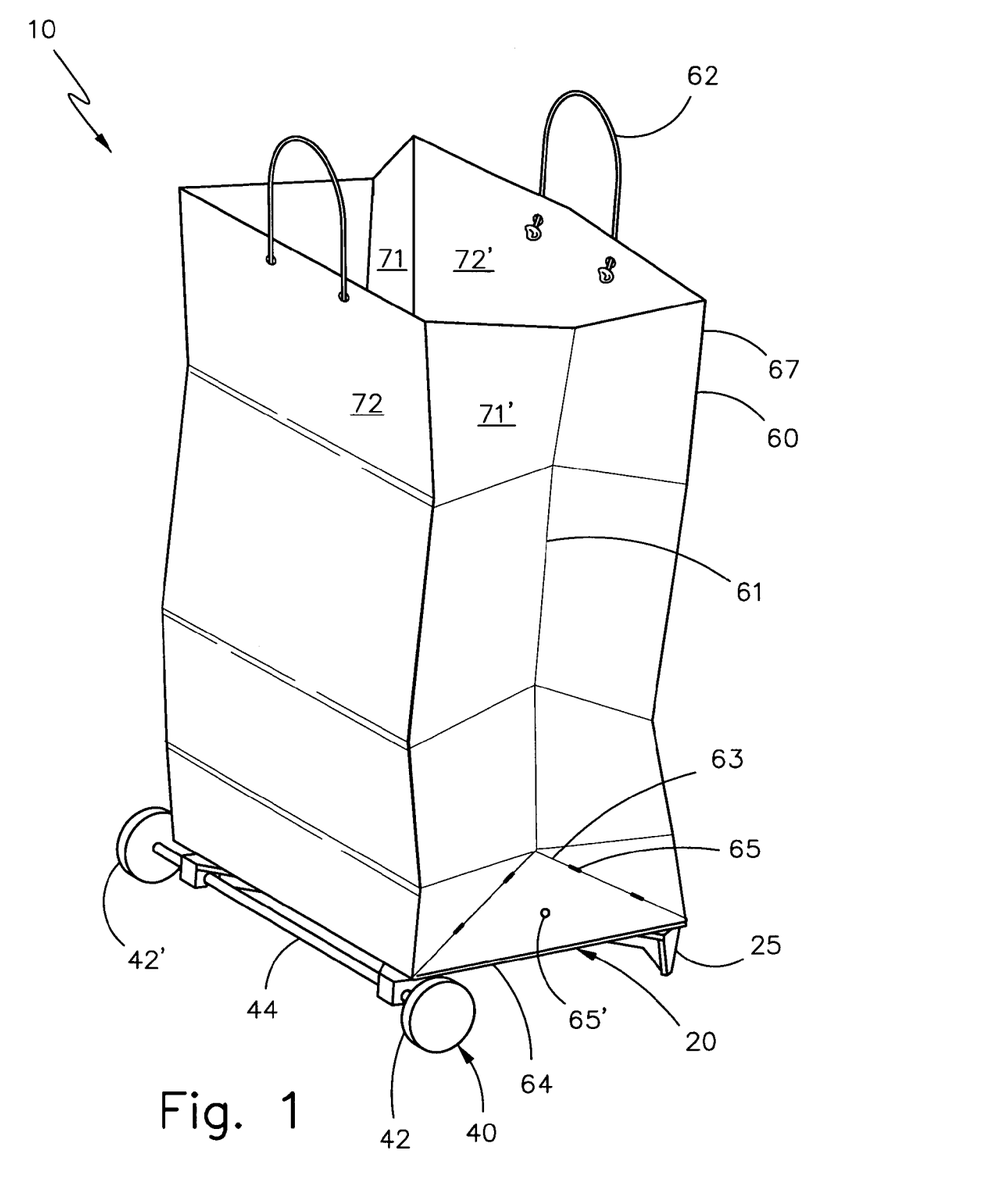
FIG. 1 represents an isometric view of one the embodiments of the present invention with the wheeled assembly mounted on the longer end of the bottom assembly having a rectangular shape. The folds of the bag assembly and the venting slots 65 along the diagonal folds are shown, as well as venting holes 65'.

Referring now to the drawings, where the present invention is generally referred to with numeral 10, it can be observed that it basically includes base or bottom assembly 20, wheel assembly 40 and bag assembly 60. A user typically tilts wheeled bag device 10 about the end having the wheels and pulls from handles 62. FIG. 1 shows the end with wheel assembly 40 as the wider side of a bag assembly 60 with a rectangular projection. The shopping bag device 10 stands in a substantially upright position.

Figure 6:
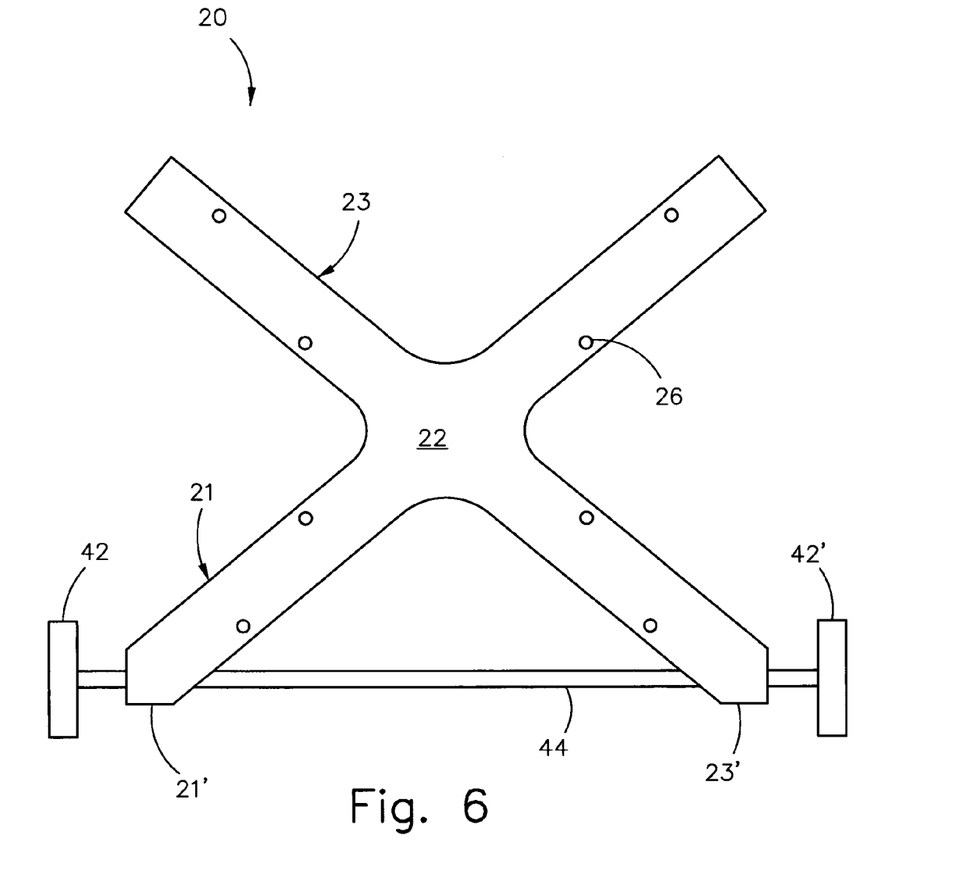
FIG. 6 is a top view of the base or bottom assembly 20 showing two crossed elongated members and the two wheels.
Figure 7:
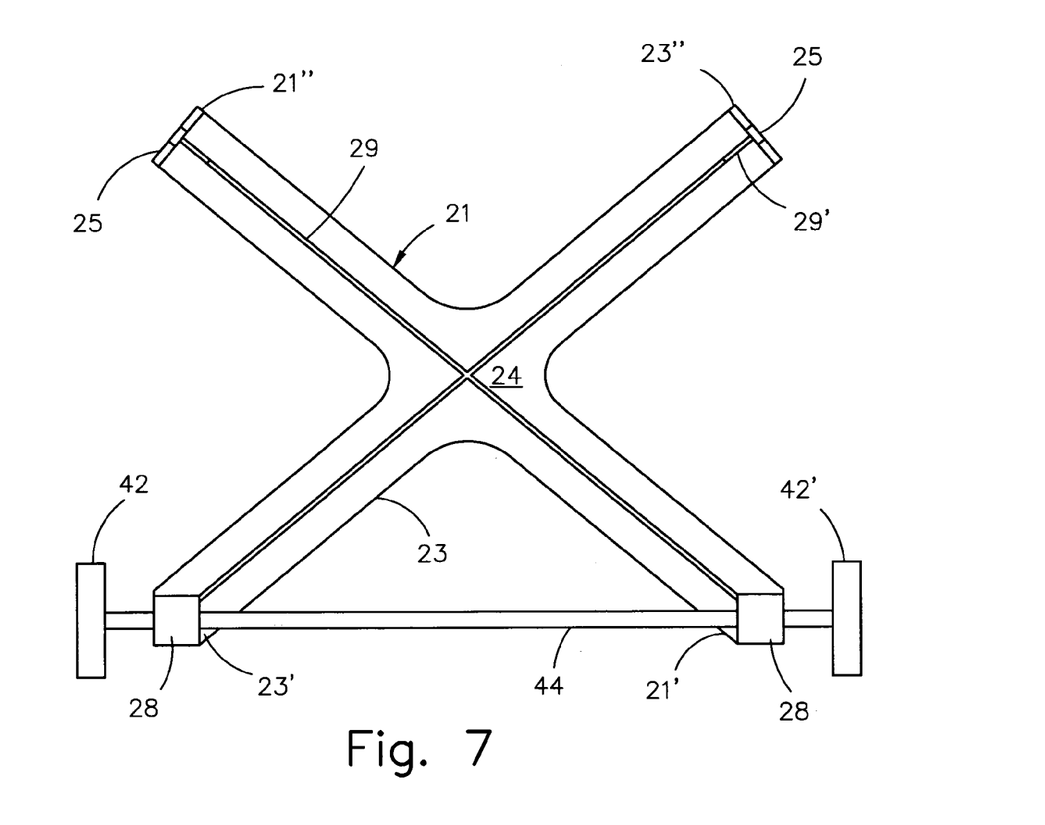
FIG. 7 is a bottom view of what is shown in the previous figure with bushing assembly 28 supporting shaft 44.
Figure 7A:
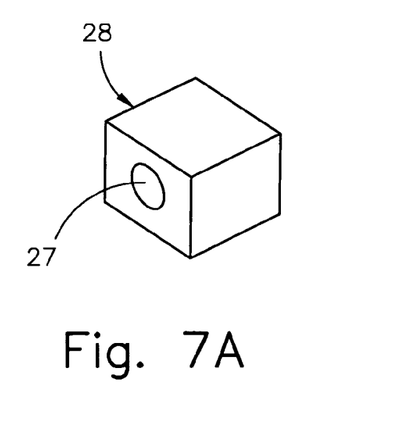
FIG. 7A is an isometric view of bushing assembly 28 used in the previous figure.
Figure 7B:
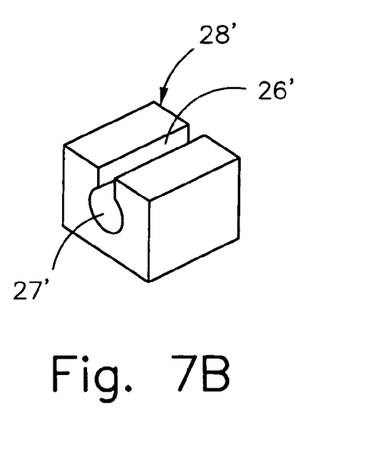
FIG. 7B is an alternate embodiment for a bushing assembly referenced with numeral 28'.
Figure 8:
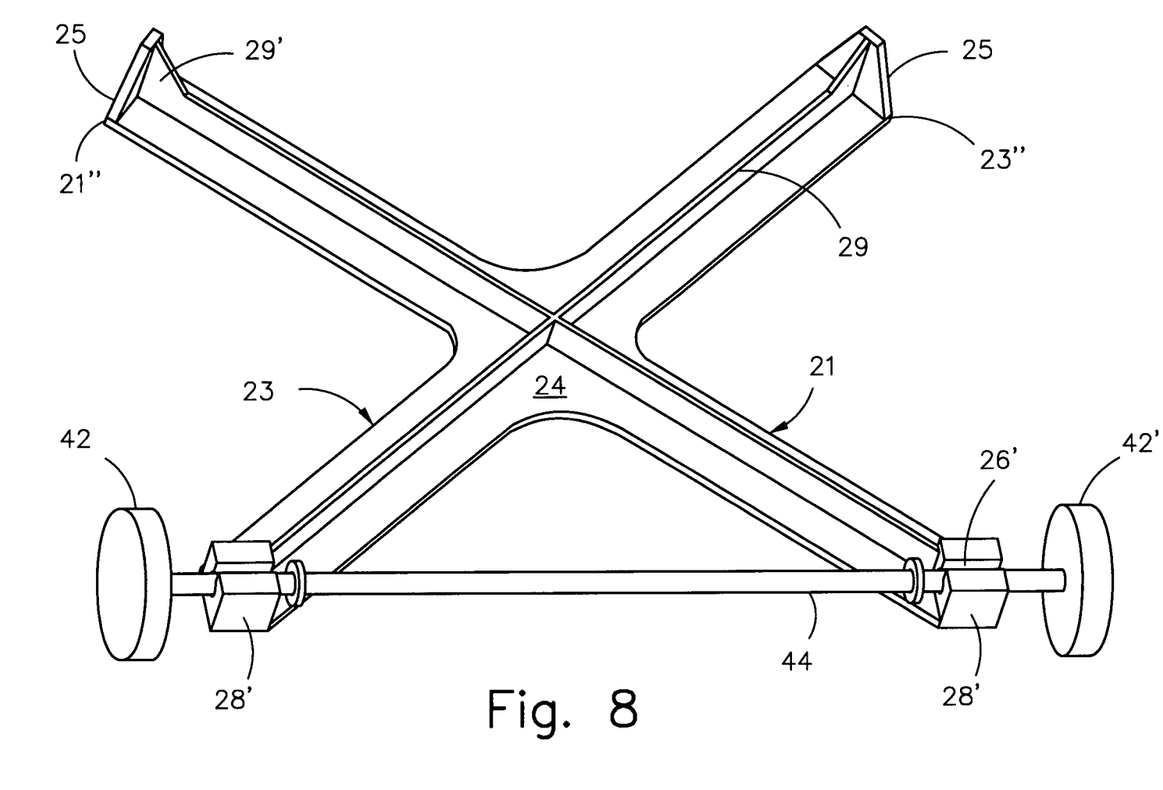
FIG. 8 is an isometric view of the alternate embodiment shown in the previous four figures using the alternate bushing assembly 28'.

Bottom or base assembly 20 is shown in FIGS. 6 through 8 where a molded plastic material is used with sufficient degree of rigidity. This option is compatible with mass production molding techniques and permits the minimization of material usage, as well as its weight, yet maintaining its functionality. This embodiment includes integrally built crossed members 21 and 23 that are angularly disposed with respect to each other. The angle varies depending on the dimensions intended for the bag's footprint. If members 21 and 23 are perpendicular to each other, the footprint will be a square. It is preferred to have a rectangular bag footprint that resembles those of commercially available bags. It has been found that with the angle between members 21 and 23 of approximately 120 degrees, the resulting bag assembly 60 works well. This angle, however, can vary from 60 degrees to 150 degrees and still result in a practical projection for device 10.

Figures 3A, 3B:
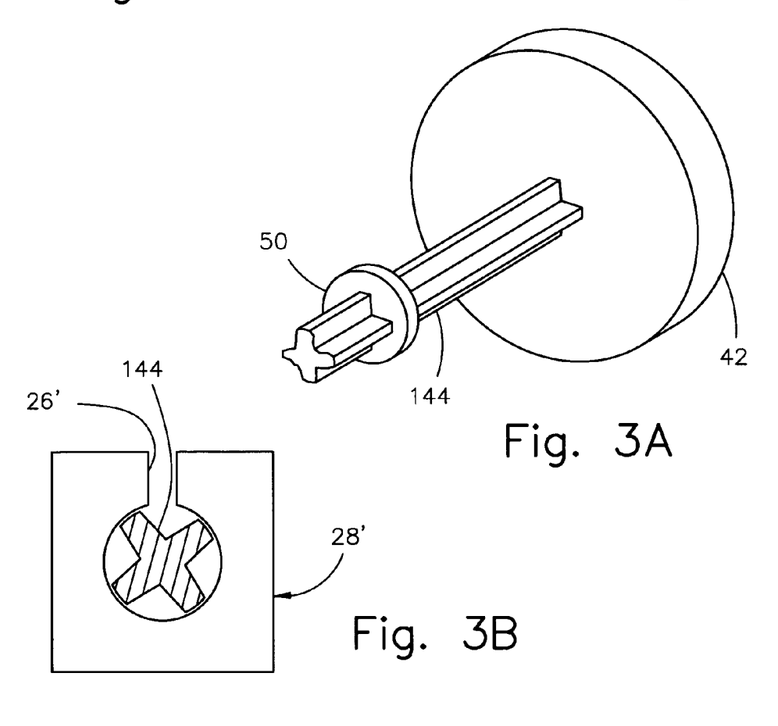
FIG. 3A shows a partial isometric enlarged view of the shaft 144, stopper 50, and wheel 42.
FIG. 3B shows an elevational cross-sectional view of shaft 144 inside bushing 28'.

In FIG. 6, upperside 22 can be observed with the front wheel ends 21' and 23' connected by wheel assembly 40. Assembly 40 includes shaft 44 and wheel members 42 and 42' mounted to the ends. Cross members 21 and 23 are connected by shaft 44. Shaft 44 includes wheel members 42 and 42' rigidly mounted to the ends of shaft 44. Shaft 44 is rotatably mounted to the underside 24 of base assembly 20, as explained below. In FIGS. 3A and 3B, the shaft has a star cross-section with four legs (stars with three legs or five or more can also be used) to minimize its weight.

FIG. 7 shows underside 24 where members 21 and 23 include a perpendicularly mounted reinforcement rib member 29 with sub-ends 29' reinforcing spacer leg member 25. Adjacent to front ends 21' and 23', bushing assemblies 28 (or equivalent structure such as bushing assembly 28' showing in FIG. 7B) are mounted. The through openings 27 are aligned to permit shaft 44 to go through and be rotatably journaled. The same applies for alternate bushing assemblies 28' where through openings 27' are also aligned. With assembly 28', shaft 44 is pressed in through cut 26' with a predetermined force magnitude and that cammingly enlarges cut 26' as shaft 44 passes through. Assembly 28' has the advantage of not requiring the disassembly of wheels 42 for its removal. FIG. 8 shows bottom assembly 20 using bushing assemblies 28'.

In FIG. 8, it can also be observed that spacer leg members 25 extend perpendicularly from the ends 21" and 23" of members 21 and 23, respectively. The dimensions of spacer leg members 25 are selected to cooperate with the dimensions of wheels 42 to approximate a plane that is parallel to a supporting surface, typically horizontal. Reinforcement end 29' keeps member 25 in a perpendicular disposition with respect to members 21 and 23.

Bag assembly 60 has a bottom wall 64 that is mounted to upperside 22 directly. Bag assembly 60 is thus mounted over upperside 22 directly. Bag assembly 60 extends upright defining a compartment and has an opening at its distal upper end.

Bag assembly 60 has overall dimensions that cooperate with the dimensions of bottom assembly 20 on which it is mounted. The height of bag assembly 60 is ergonomically compatible with the height of most users to permit the user to comfortably pull bag device 10 when tilted. Bag assembly 60 is made out of a paper base material, in one of the embodiments, with a thickness range between 100 and 800 grams per square meter. It has been found that paper material with this thickness provides sufficient rigidity to keep bag assembly 20 open, aided with cooperatively positioned transversal folds along integral hinges. At the same time, several cooperatively designed integral hinges or folds permit the ready deployment and collapse of bag assembly 20. To permit the entry and exit of air inside bag assembly 20, slots 65 are inconspicuously perforated through diagonal bag folds 63. Optionally, through holes 65' can also be used outside of folds 63. If holes 65' are used instead of slots 65, then the resistance of diagonal bag fold 63 is increased. Through openings 26 are designed to receive an adhesive therethrough to improve the engagement with upperside 22.

Bag assembly 60 includes four longitudinal corner bag folds 67 defining longitudinal walls 71; 71'; 72; and 72'. Walls 71 and 71' each include one longitudinal bag fold 61.

Figures 2A, 2B:
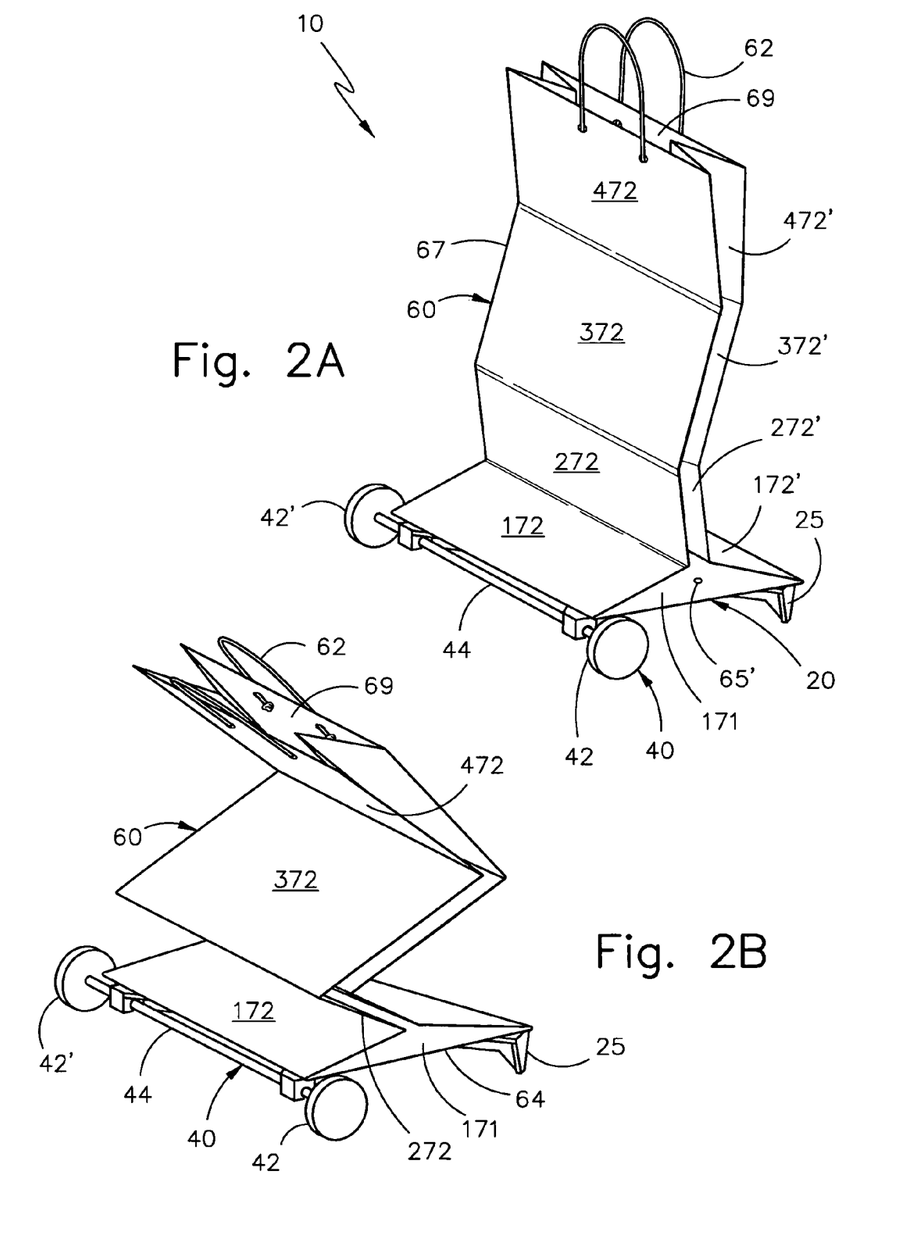
FIG. 2A shows an isometric view of bag assembly 60 in a partly collapsed condition.
FIG. 2B is another isometric view of bag assembly 60 in a substantially collapsed condition, similar to FIG. 2A.
Figure 2C:
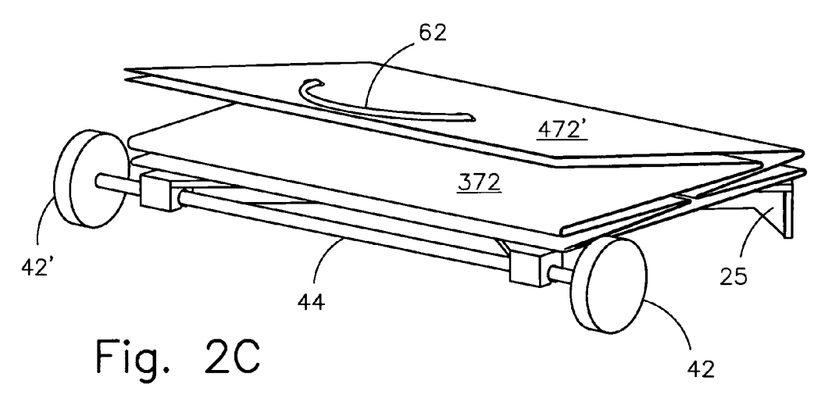
FIG. 2C shows an isometric view of bag assembly 60 in its fully collapsed state.

To facilitate the collapse or folding of bag assembly 60, diagonal bag folds 63 and longitudinal bag folds 61 cooperate with longitudinal walls 71 and 71', as best seen in FIGS. 1 and 2A. When bag opening 69 is being closed, air exits also through slots 65 (and, optionally, holes 65'). The first fold of the lowermost section of bag assembly 60 results in walls 71 and 71' defining triangular portions 171, and the lowermost portions of walls 72 and 72' defining rectangular portions 172 and 172'. Portions 171; 172; and 172' are brought towards upperside 22 of bottom assembly 20. Then, portions 272 and 272' of walls 72 and 72', respectively, are folded, as best seen in FIG. 2B. Portion 272' is longer than potion 272. This is followed by portions 372 and 372'. Portions 472 and 472' are the last ones, in this embodiment, resulting in a footprint confined within the dimensions of upperside 22 of bottom assembly 20.

Figure 5:
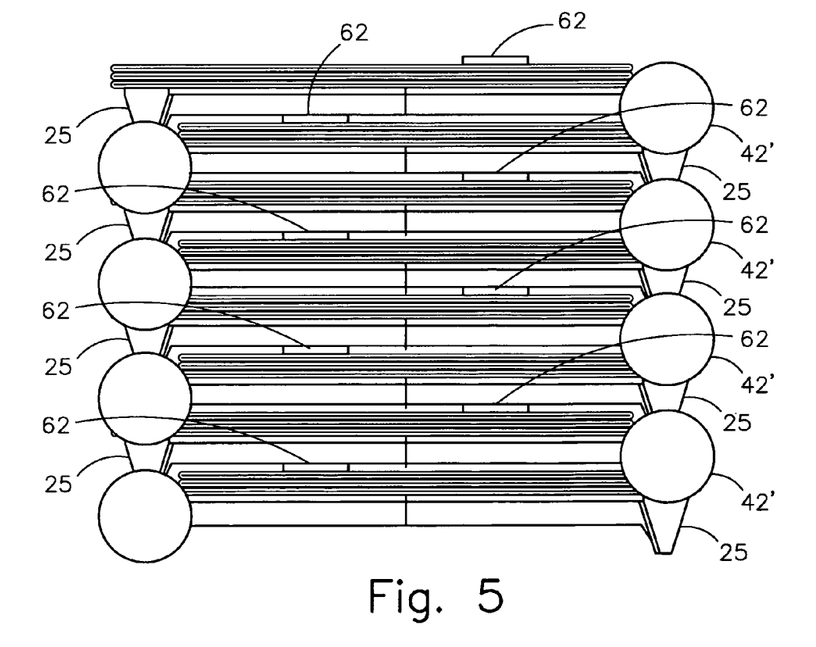
FIG. 5 illustrates the stackable characteristics of one embodiment of the present invention shown in the previous figures.
Figure 5A:
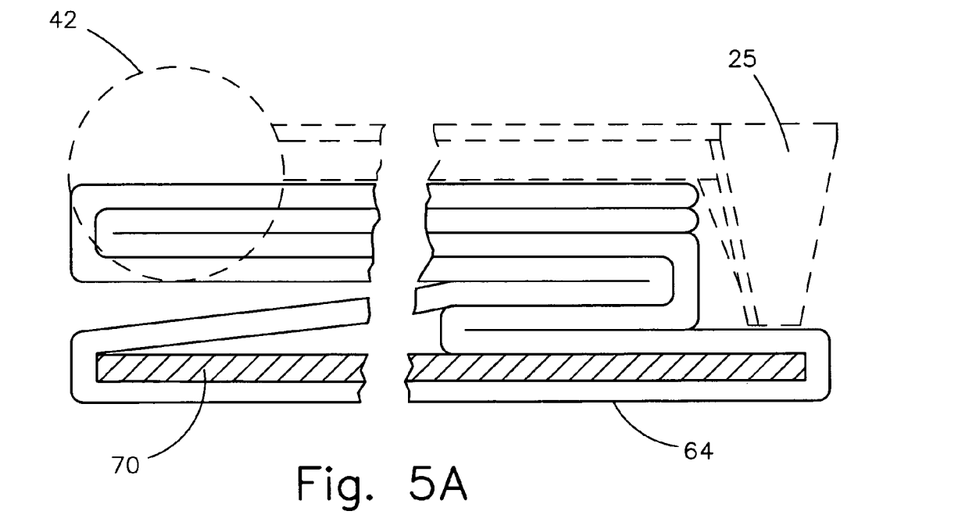
FIG. 5A is a partial side elevational representation of the bag folds (without the handles) showing how a clearance space for the contiguously positioned spacer leg member is provided by shortening the length of the folds.
Figure 5B:
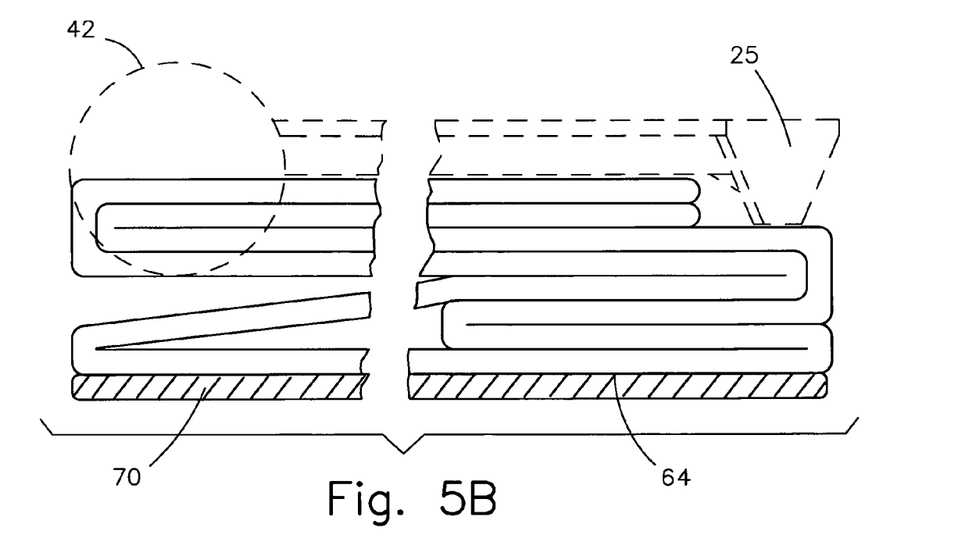
FIG. 5B is similar to the previous figure except that two folds are shortened.

In one of the embodiments, portions 372; 372'; 472; and 472' have smaller dimensions than what they would otherwise have to fit the entire footprint or plan projection of upperside 22, as seen in FIGS. 5A and 5B. This is desirable in order to provide clearance for spacer leg members 25 of adjacent bag device 10 stacked up above, when storing it. This option will minimize the spaces between stacked bag devices, shown in FIG. 5, reducing somewhat the overall height of the stack.

Wheel assembly 40 includes shaft 44 that is slidably passed through through opening 27 (or 27') allowing shaft 44 to rotate. Wheel members 42 and 42' are rigidly mounted to the ends of shaft 44. An adhesive can be used to secure wheel members 42 and 42' to the ends of shaft 44. The ends of shaft 44 protrude a sufficient distance to permit the mounting of wheels 42 and 42' to the former. As shown in FIG. 3A, an equivalent embodiment for shaft 44 is represented as shaft 144 with a star cross-section. This provides additional savings in cost and weight. Stopper 50 is positioned a predetermined distance from wheel 42 to prevent shaft 144 (or 44) to limit its transversal movement. In FIG. 3B, shaft 144 is shown in cross-section inside of bushing 28'.

Figure 4:
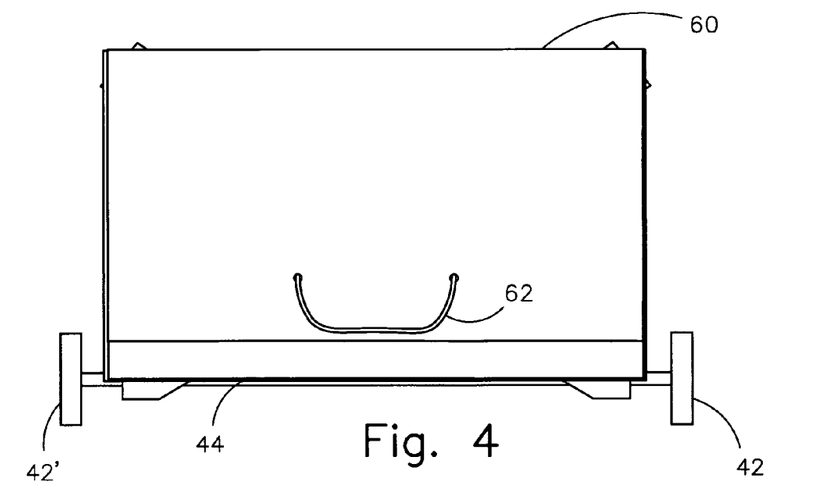
FIG. 4 illustrates a top plan view of collapsed bag assembly 60 and handle 62 slid inside.

For storage, device 10 is volumetrically efficient requiring minimum footprint, as shown in FIG. 4. FIG. 5 shows one of the preferred manners for stacking up devices 10, which results in a stable stacked structure. In FIGS. 5A and 5B, the elevational representation of two versions of folded bag 60 is shown to accommodate spacer leg members 25 of different dimensions to permit the adjacent device 10 (shown in broken lines) to fit and this resting in a substantially horizontal position. Optionally, a flat reinforcement member 70 (a sheet of plastic or cardboard) is added either inside of bag assembly 60 (FIG. 5A) or outside adjacent to bottom wall 64 (FIG. 5B). Member 70 in FIG. 5B can be glued to bottom wall 64 and upperside 22. This will prevent the rupture of bottom wall 64.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A wheeled bag assembly, comprising:
A) a bottom assembly having elongated and rigid first and second members crossing each other at an angle between 60 and 150 degrees, each of said first and second members including first and second ends and having cooperative dimensions to define an upperside and an underside having a substantially rectangular projection, and further including first and second bushing assemblies mounted to each of said first ends, respectively, wherein said bottom assembly is made out of moldable plastic material including a plurality of through openings and an adhesive used for mounting said bag member to said upperside with said adhesive passing through said through openings enhance the adherence of said bag member to said upperside;
B) wheels means including a shaft having third and fourth ends, said shaft being rotatable within said first and second bushing assemblies and said third and fourth ends extending a predetermined distance outwardly beyond said first and second bushing assemblies, respectively, and further including first and second wheel members rigidly mounted to said third and fourth ends, respectively, and the radii of said first and second wheel members being substantially identical and thereby permitting said wheels means to come in contact with a supporting surface;
C) a collapsible bag member having a substantially flat bottom wall mounted over said upperside, said bag member extending away from said upperside defining an internal compartment, a lower end, and an upper end, the latter defined by an opening at a first predetermined distance away from said bottom wall, said bag member including a plurality of through holes adjacent to said lower end permitting the air inside said compartment to exit when said bag member is collapsed and to allow said air in when said bag member is deployed, and further including handle means mounted adjacent to said upper end opening thereby permitting a user to tilt and move said bag assembly riding over said wheel members, wherein said bag member includes a first fold adjacent to said lower end resulting in triangular projections and a plurality of transversal folds falling within the projections of said upperside; and
D) a spacer leg member mounted to said second ends and extending away from said underside a second predetermined distance that is equal to approximately said wheel radius so that, at rest, said bottom assembly is positioned at a substantially parallel and spaced apart relationship with respect to a supporting surface and wherein said bag member is foldable, when collapsed, to fit within the perimeter of said rectangular projection.

2. The bag assembly set forth in claim 1 wherein said folds and dimensions of said bag member cooperate to cause said upper end to end a predetermined distance from the edge of said upperside thereby providing a predetermined clearance for said spacer leg members of abutting stacked-up bag assemblies to land.

3. The bag assembly set forth in claim 2 further including a reinforcement member mounted over said bottom wall interiorly in said bag member.

4. The bag assembly set forth in claim 3 further including a flat reinforcement means mounted between said upperside and said bottom wall.

5. The bag assembly set forth in claim 4 wherein said first and second members are substantially flat and include a central and perpendicularly disposed elongated reinforcement rib member with enlarged ends abuttingly mounted to said spacer leg members.

6. The bag assembly set forth in claim 5 wherein said shaft includes first and second stopper members positioned at cooperative distances from said third and fourth ends to limit the axial travel of said shaft.

7. The bag assembly set forth in claim 6 wherein said shaft has a star cross-section thereby minimizing weight.

8. The bag assembly set forth in claim 7 wherein said bag member is made out of paper having between 100 and 800 grams per square meter to provide sufficient rigidity yet being capable of folding along transversal integral hinges.

\* \* \* \* \*